United States Patent [19]
Roy et al.

[11] 3,847,653
[45] Nov. 12, 1974

[54] METHOD AND APPARATUS FOR FABRICATING COMPOSITE CERAMIC MEMBERS

[75] Inventors: Prodyot Roy, Saratoga; James L. Simpson, San Jose; Edward A. Aitken, Danville, all of Calif.

[73] Assignee: The United States of America as represented by the United States Atomic Energy Commission, Washington, D.C.

[22] Filed: Oct. 27, 1972

[21] Appl. No.: 301,411

[52] U.S. Cl. ............................. 117/93, 117/106 R
[51] Int. Cl. ............................................ C23c 11/08
[58] Field of Search ...................... 117/106 R, 93

[56] References Cited
UNITED STATES PATENTS

| | | | |
|---|---|---|---|
| 3,014,815 | 12/1961 | Lely et al. ....................... | 117/106 R |
| 3,034,924 | 5/1962 | Kraus et al. ..................... | 117/106 R |
| 3,268,362 | 8/1966 | Hanak et al. ..................... | 117/227 |
| 3,343,979 | 9/1967 | Hamrin ........................ | 117/107.2 R |
| 3,356,703 | 12/1967 | Mazdiyasni ..................... | 117/106 R X |

Primary Examiner—Leon D. Rosdol
Assistant Examiner—Harris A. Pitlick
Attorney, Agent, or Firm—John A. Horan; Frederick A. Robertson; L. E. Carnahan

[57] ABSTRACT

Method and apparatus for fabrication of composite ceramic members having particular application for measuring oxygen activities in liquid sodium. The method involves the simultaneous deposition of $ThO_2$: 15 percent $Y_2O_3$ on a sintered stabilized zirconia member by decomposition of gaseous $ThCl_4$ and $YCl_3$ and by reacting with oxygen gas.

4 Claims, 1 Drawing Figure

PATENTED NOV 12 1974
3,847,653
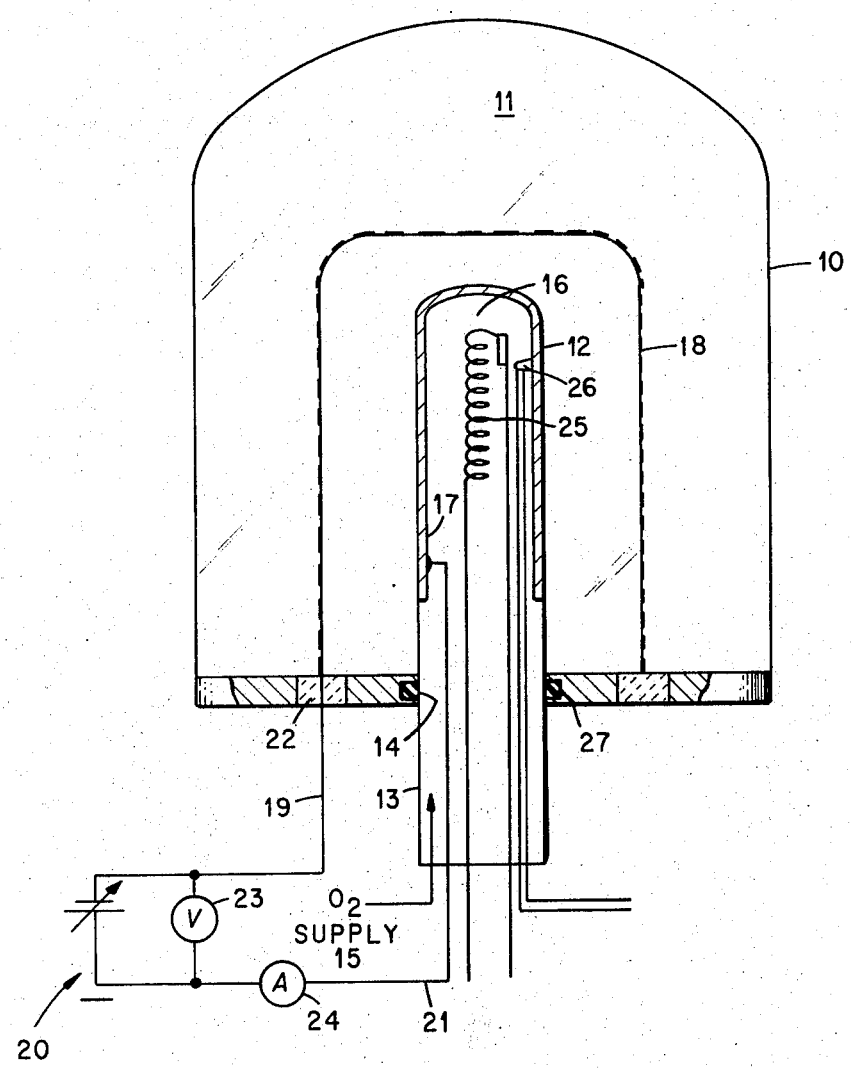

METHOD AND APPARATUS FOR FABRICATING COMPOSITE CERAMIC MEMBERS

BACKGROUND OF THE INVENTION

The invention described herein was made in the course of, or under, Contract No. AT(04-3)-189, Project Agreement No. 15, with the United States Atomic Energy Commission.

This invention relates to the fabrication of composite ceramic members, and more particularly to the simultaneous deposition of $ThO_2$: 15 percent $Y_2O_3$ on a sintered stabilized zirconia member.

To satisfy the continuing demand for new and better materials various processes and apparatus have been developed in the art. The co-deposition of selected materials -- on a substrate, thus providing added capabilities of satisfying the needs for new materials are exemplified by U.S. Pat. No. 3,268,362 issued Aug. 23, 1966, and No. 3,343,979 issued Sept. 26, 1967. With the development of liquid metal as a coolant for nuclear reactors additional requirements for materials which will withstand the operating conditions have been imposed. For example, simple yet effective means for providing measurements of oxygen concentration of liquid sodium in the liquid metal fast breeder reactor has produced a need for materials capable of withstanding the temperature and corrosion conditions imposed thereon, such a means having been described and claimed in co-pending U.S. Pat. application Ser. No. 306,976 filed Nov. 15, 1972, and now Pat. No. 3,776,831, entitled "Device For Measuring Oxygen Activity," which basically comprises a composite ceramic member of stabilized zirconia coated with a thin layer of thoria-yttria.

Conventional methods of fabrication of composite ceramics are co-extrusion, plasma spraying, and slip castings. All these processes require high temperature (1900°C) heat treatment for sintering of the ceramics to attain an impervious state. Sintering of the composite materials at a high temperature creates severe problems due to differential thermal expansion of two different materials which causes cracking during sintering operations.

SUMMARY OF THE INVENTION

The present invention overcomes the problems of the prior art methods of fabricating composite ceramic members by eliminating the high temperature sintering and thus the cracking problems associated therewith, while eliminating impurity contamination during processing and providing better control on the thickness of the layers at fabricating costs lower than those of conventional methods. This is accomplished by a method and apparatus which involves the simultaneous deposition of $ThO_2$:15 percent $Y_2O_3$ on a sintered stabilized zirconia member by decomposition of gaseous $ThCl_4$ and $YCl_3$ and by reacting with oxygen gas.

Therefore, it is an object of this invention to provide a method for fabricating composite ceramic members.

A further object of the invention is to provide a method for fabricating composite ceramic members by deposition of $ThO_2$:15 percent $Y_2O_3$ on a sintered stabilized zirconia member.

Another object of the invention is to provide a method for making composite ceramic members involving decomposition of gaseous $ThCl_4$ and $YCl_3$ and by reacting with oxygen gas.

Another object of the invention is to provide an apparatus for simultaneously depositing $ThO_2$:15 percent $Y_2O_3$ on a sintered stabilized zirconia member by decomposition of gaseous $ThCl_4$ and $YCl_3$ and by reacting with oxygen gas.

Other objects of the invention will become readily apparent from the following description and accompanying drawing.

BRIEF DESCRIPTION OF THE DRAWING

The single FIGURE, partially in cross-section, illustrates the novel apparatus for carrying out the inventive fabrication method.

DESCRIPTION OF THE INVENTION

This invention is directed to an apparatus and method for producing composite ceramic members by the simultaneous deposition of $ThO_2$:15 percent $Y_2O_3$ on a sintered stabilized zirconia member by decomposition of gaseous $ThCl_4$ and $YCl_3$ and by reacting with oxygen gas. Members made in accordance with this invention have particular application in the measurement of oxygen concentration of liquid sodium, and the description will be directed toward the fabrication of a closed end ceramic tube utilized for such measurements, but it is not intended to limit the invention to the specific configuration produced thereby or to the above-described application therefor, as the invention can be utilized for producing various configurations for numerous applications.

Basically, the invention consists of simultaneous deposition of thoria-yttria ($ThO_2$:15 percent $Y_2O_3$) on a sintered stabilized zirconia tube, such as zirconia-calcia ($ZrO_2$:15 percent CaO), by decomposition of gaseous $ThCl_4$ and $YCl_3$ by reacting it with oxygen gas by the following reaction:

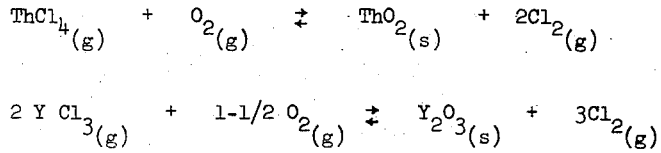

At about 1000°C, this type of gaseous decomposition product will form a layer of homogeneous and theoretically dense mixture of $ThO_2$ and $Y_2O_3$ on the zirconia substrate.

In order to deposit $ThO_2$ and $Y_2O_3$ on the outside surface of a zirconia tube, oxygen must be made available at the surface of the tube. This is accomplished by migrating oxygen gas from inside the tube across the tube wall to the outside surface, as described in greater detail hereinafter.

Referring now to the drawing an embodiment of the novel apparatus for carrying out the method of fabrication is illustrated and comprises a bell jar 10 containing a static atmosphere indicated at 11 of a mixture of gaseous chlorides ($ThCl_4$ and $YCl_3$) in proper proportion, about a closed-end tube or member 12 of stabilized zirconia ($ZrO_2$:15 percent CaO) positioned within bell jar 10 and having a reduced diameter end portion 13 extending from an opening 14 in the bell jar with an O-ring seal 15 about opening 14 to prevent leakage of the gaseous chloride mixture 11 from the bell jar 10. The oxygen gas required to deposit $ThO_2$ and $Y_2O_3$ on the outer surface of the zirconia tube 12 is migrated through the walls of tube 12 from an oxygen supply 15 extending into an interior chamber or cavity 16 of tube 12. The oxygen gas reaching the outer surface of the tube will react instantly with the gaseous mixture 11 of $ThCl_4$ and $YCl_3$ to form respective oxides on the surface of the tube. Since both the stabilized zirconia tube 12 and the oxide layer of $ThO_2$:15 percent $Y_2O_3$ formed on the surface thereof are theoretically dense, molecular diffusion of the oxygen gas through the tube wall will not take place. However, both of these ceramics are anionic conductors, hence $O^{2-}$ ions can be migrated through the tube wall under an electrical potential gradient. To accomplish this, the inside surface of the stabilized zirconia tube 12 is coated with a thin conductive film 17 such as gold which will act as a cathode, while the outside of the tube 12 is surrounded by a grid cage 18 made of an electrical conductive material (e.g., an alloy of Th with 15 percent Y), the grid cage 18 being placed at a distance of approximately one centimeter from the outside surface of tube 12, and will act as an anode. Grid cage 18 is connected to an electrical lead 19 from a variable d-c power supply 20, while conductive film 17 is connected via lead 21 to power supply 20. Bell jar 10 is provided with an insulative collar or member 22 through which electrical connection between cage 18 and lead 19 extends. A voltmeter 23 is positioned between leads 19 and 21 and in parallel with power supply 20, while an ammeter 24 is connected in lead 21 intermediate the conductive film 17 and the point of connection of voltmeter and lead 21. The stabilized zirconia tube 12 is heated, for example, to the above mentioned temperature of about 1000°C by a resistance heater 25 positioned in the interior cavity 16 of the tube and is connected to an appropriate power supply, not shown, the temperature of conductive film 17 being indicated by a thermocouple 26. Thus, a d-c potential will be applied across the cathode (film 17) and the anode (grid cage 18) thereby providing an electrical potential gradient across tube 12 such that the oxygen gas from supply 15 at the inside of the tube will enable the oxygen ions to migrate across the tube walls to react with the gaseous chlorides of mixture 11 by the following mechanisms:

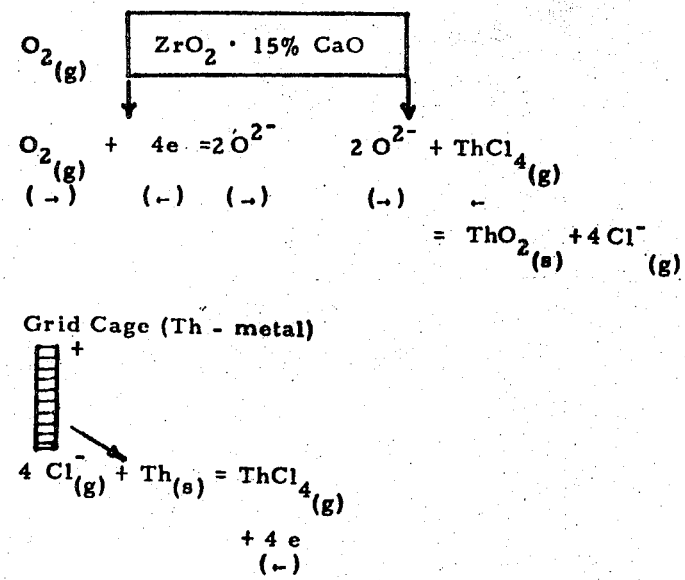

The amount of oxygen passing through the walls of tube 12 will be determined by measuring the current indicated by ammeter 24, flowing through the tube wall. The rate of oxygen migration, and consequently the rate of oxide film or layer growth on the outside surface of tube 12 will be controlled by changing the potential, indicated by voltmeter 24, across the tube.

Thus, the present invention provides a method and apparatus for producing composite ceramics which has the following improvements over conventional processing techniques:

1. No high temperature (~1900°C) sintering is required and thus the cracking problems due to differential thermal expansion of two different ceramics at high temperatures is eliminated.

2. A better control on the thickness of the ceramic layers is provided.

3. Impurity contamination of the ceramics during processing (e.g., grinding, heat treatment, etc.) is eliminated.

4. The cost of fabricating these types of ceramics is considerably less than conventional methods.

While a particular embodiment of the apparatus and specific materials have been set forth to illustrate and describe the invention, modifications will become apparent to those skilled in this art, and it is intended to cover in the appended claims all such modifications as come within the spirit and scope of the invention.

What we claim is:

1. A method of fabricating composite ceramic members comprising the step of: simultaneously depositing $ThO_2$: 15 percent $Y_2O_3$ on a sintered stabilized zirconia member composed of $ZrO_2$:15 percent CaO by decomposition of gaseous $ThCl_4$ and $YCl_3$, and by reacting with oxygen gas migrated through the member under an electrical potential gradient.

2. The method defined in claim 1, wherein the step of depositing $ThO_2$:15 percent $Y_2O_3$ is accomplished by the steps of: surrounding the stabilized zirconia member with gaseous chlorides $ThCl_4$ and $YCl_3$, and migrating the oxygen through the walls of the stabilized zirconia member to react with the gaseous chlorides, and maintaining the stabilized zirconia member at a temperature of about 1000°C to carry out the decomposition of the gaseous chlorides and the reaction thereof with the oxygen.

3. The method defined in claim 2, wherein the step of migrating the oxygen through the walls of the stabilized zirconia member is accomplished by providing an electrical potential gradient across the walls of the stabilized zirconia member.

4. The method defined in claim 3, wherein the step of providing the electrical potential gradient is carried out by positioning a cathode means on one wall surface area of the stabilized zirconia member, positioning an anode means adjacent to and spaced from the opposite wall surface area thereof, and supplying an electrical potential thereacross.

* * * * *